(12) United States Patent
Tohara et al.

(10) Patent No.: US 7,419,449 B2
(45) Date of Patent: Sep. 2, 2008

(54) LOW FRICTION CHAIN

(75) Inventors: Takashi Tohara, Osaka (JP); Hiroshi Hashimoto, Osaka (JP); Toshiyuki Nakajima, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/820,047

(22) Filed: Jun. 18, 2007

(65) Prior Publication Data

US 2008/0020882 A1    Jan. 24, 2008

(30) Foreign Application Priority Data

Jul. 21, 2006   (JP)   .............................. 2006-199968

(51) Int. Cl.
*F16H 9/00* (2006.01)
(52) U.S. Cl. ..................... 474/213; 474/212
(58) Field of Classification Search ................ 474/212, 474/213, 273, 206
See application file for complete search history.

(56) References Cited

U.S. PATENT DOCUMENTS

| | | | | | |
|---|---|---|---|---|---|
| 2,056,597 | A | * | 10/1936 | Blake ........................ | 474/91 |
| 3,292,670 | A | * | 12/1966 | Ratz et al. ................. | 30/123.4 |
| 3,478,787 | A | * | 11/1969 | Miller ....................... | 30/123.4 |
| 4,434,556 | A | * | 3/1984 | Nitschmann et al. ....... | 30/123.4 |
| 4,509,323 | A | * | 4/1985 | Ledvina et al. ................ | 59/8 |
| 5,154,674 | A | * | 10/1992 | Avramidis et al. .......... | 474/214 |
| 5,176,585 | A | * | 1/1993 | Novak ....................... | 474/206 |
| 5,267,910 | A | * | 12/1993 | Maruyama et al. ......... | 474/212 |
| 5,758,484 | A | * | 6/1998 | Ledvina et al. ................ | 59/5 |
| 2002/0049107 | A1 | * | 4/2002 | Ledvina ..................... | 474/213 |
| 2006/0160648 | A1 | * | 7/2006 | Hummel et al. ............. | 474/206 |

FOREIGN PATENT DOCUMENTS

| EP | 1 184 593 A1 | 3/2002 |
|---|---|---|
| JP | 54-59663 | 4/1979 |
| JP | 59-30936 | 7/1984 |
| JP | 2000-002304 | 1/2000 |
| JP | 2003-176853 | 6/2003 |

* cited by examiner

*Primary Examiner*—Christopher P Schwartz
(74) *Attorney, Agent, or Firm*—Howson & Howson LLP

(57) ABSTRACT

A low friction roller chain, bushing chain or silent chain is composed of links in which at least some of the link plates have convex and/or grooved edge surfaces adapted to slide on the surface of a chain guide.

2 Claims, 6 Drawing Sheets

LOW FRICTION CHAIN

CROSS-REFERENCE TO RELATED APPLICATION

This application claims priority on the basis of Japanese patent application 2006-199968, filed Jul. 21, 2006. The disclosure of Japanese application 2006-199968 is hereby incorporated by reference.

FIELD OF THE INVENTION

This invention relates to chains used in power transmission mechanisms for use in industrial machines, vehicles, conveyors and the like, and more particularly to the reduction in friction in a chain transmission. The invention has particular utility as a low friction chain in the timing drive of an automobile engine.

BACKGROUND OF THE INVENTION

In a typical chain transmission, a chain is in mesh with the teeth of a driving sprocket and one or more driven sprockets. In an automobile engine, for example, the timing chain transmits power from a sprocket on the engine crankshaft to one or more valve-operating camshafts. The chain is typically in sliding contact with several guides, one being a fixed guide in contact with the portion of the chain that travels in tension from a camshaft sprocket toward the crankshaft sprocket, and another guide being a movable guide, such as a pivoted tensioner lever, in contact with the portion of the chain traveling from the crankshaft sprocket toward a camshaft sprocket.

A typical roller chain or rollerless bushing chain is composed a first set of links each comprising a pair of opposed inner link plates connected by a pair of bushings, and a second set of links, each comprising a pair of opposed outer link plates connected by pins. The links of the first set are disposed in alternating relationship with the links of the second set, with each pin of a link of the second set extending through a bushing of a link of the first set. In the case of a roller chain, a roller is provided on the outside of each bushing. The link plates typically have flat upper and lower edges, extending in the direction of the length of the chain, and rounded ends, as shown in FIG. 6. The straight edges of the plates 400 come into sliding contact with the shoe surface Ga of a guide G over a relatively large area, with a resulting high friction loss, and increased fuel consumption when the chain is used as a timing chain. Other roller chains have gourd-shaped link plates, but even in the case of a chain having gourd-shaped plates, the area of contact with a guide is large enough to produce a significant friction loss.

In a chain described in Japanese Laid-Open Patent Publication No. 2003-176853, the upper and lower edges of the inner plates are farther than the upper and lower edges of the outer plates from a pitch line connecting the centers of the connecting pins. This chain construction reduces wear of the guide and reduces chain failure due to excessive forces applied at the locations at which the connecting pins are press fit into pin holes in the outer plates. However, because the inner plates have straight edges, they contact the guide over a large area, and the chain exhibits a high friction loss.

A principal object of this invention is provide an improved chain in which sliding friction between the chain and a guide is reduced. Other objects and advantages of the invention will become apparent from the following description.

SUMMARY OF THE INVENTION

The chain according to one aspect of the invention is an elongated, low friction, chain comprising a plurality of links flexibly interconnected by connecting pins extending perpendicular to the direction of elongation of the chain. Each link comprises a plurality of link plates, at least some of which have edge surfaces adapted to travel in sliding contact with a guide. In accordance with a first aspect of the invention, at least some of the edge surfaces are convex when viewed in a direction parallel to the lengths of the connecting pins.

In accordance with another aspect of the invention, at least some of the edge surfaces of the link plates that are adapted to travel in sliding contact with a guide have a groove formed therein. Preferably, the edge surfaces are both convex and grooved.

The features of the invention are applicable not only to roller chains and bushing chain, but also to silent chains.

The convex shape of the edge surfaces reduces the contact area between the link plates and the guide on which the chain slides, thereby reducing wear and improving combustion efficiency when the chain is used in an automobile engine.

As the chain having convex edge surfaces travels over the shoe of a chain guide, lubricating oil enters a relatively wide gap between the guide and a front portion of a link plate, and proceeds toward a narrow gap between the guide and the highest part of the back of the link plate, i.e., the part that is farthest from a pitch line connecting the centers of the pin holes or bushing holes of the link plate. As a result, a wedge film effect is generated in which lubricating oil is drawn into a gap, which becomes progressively narrower in the direction of movement of the oil. As the oil is drawn into the gap, its velocity increases, producing a load-sustaining pressure. Further description of the wedge film effect can be obtained from "Lubrication Terms Collection", Japanese Lubrication Institution, Jul. 20, 1981. Furthermore, Couette's flow is produced by movement of the chain over the surface of a guide. Couette's flow is a flow produced between two plates when a space between the plates is filled with fluid and one of the plates is moved in parallel with the other plate. Further description of Couette's flow can be obtained from "Science and Engineering Dictionary", Science and Engineering Dictionary Editing Committee of Science University of Tokyo, Mar. 28, 1996, p 387. Couette's flow generates a dynamic pressure urging the guide and the link plate away from each other. As a result of the wedge film effect and Couette's flow, improved wear resistance can be realized.

When a link plate edge surface which comes into sliding contact with a guide is provided with a groove, the sliding contact area between the link plate and the surface of a guide shoe on which the link plate slides is further reduced, and improved wear resistance can be realized. Furthermore, the groove holds lubricating oil and thereby prevents interruption of the oil film formed between the sliding contact surface of the link plate and the shoe surface of the guide, whereby wear resistance is further improved. When the chain is used in the timing drive of an engine, the efficiency of the engine can be significantly improved.

The provision of a groove, even on a flat guide-contacting edge of a link plate, can reduce the sliding contact area and prevent interruption of the oil film, and thereby achieve improved wear resistance.

The invention can achieve reduced sliding resistance not only in roller chains and rollerless bushing chains, but also in silent chains.

DETAILED DESCRIPTION OF THE PREFERRED EMBODIMENTS

Figure 1:
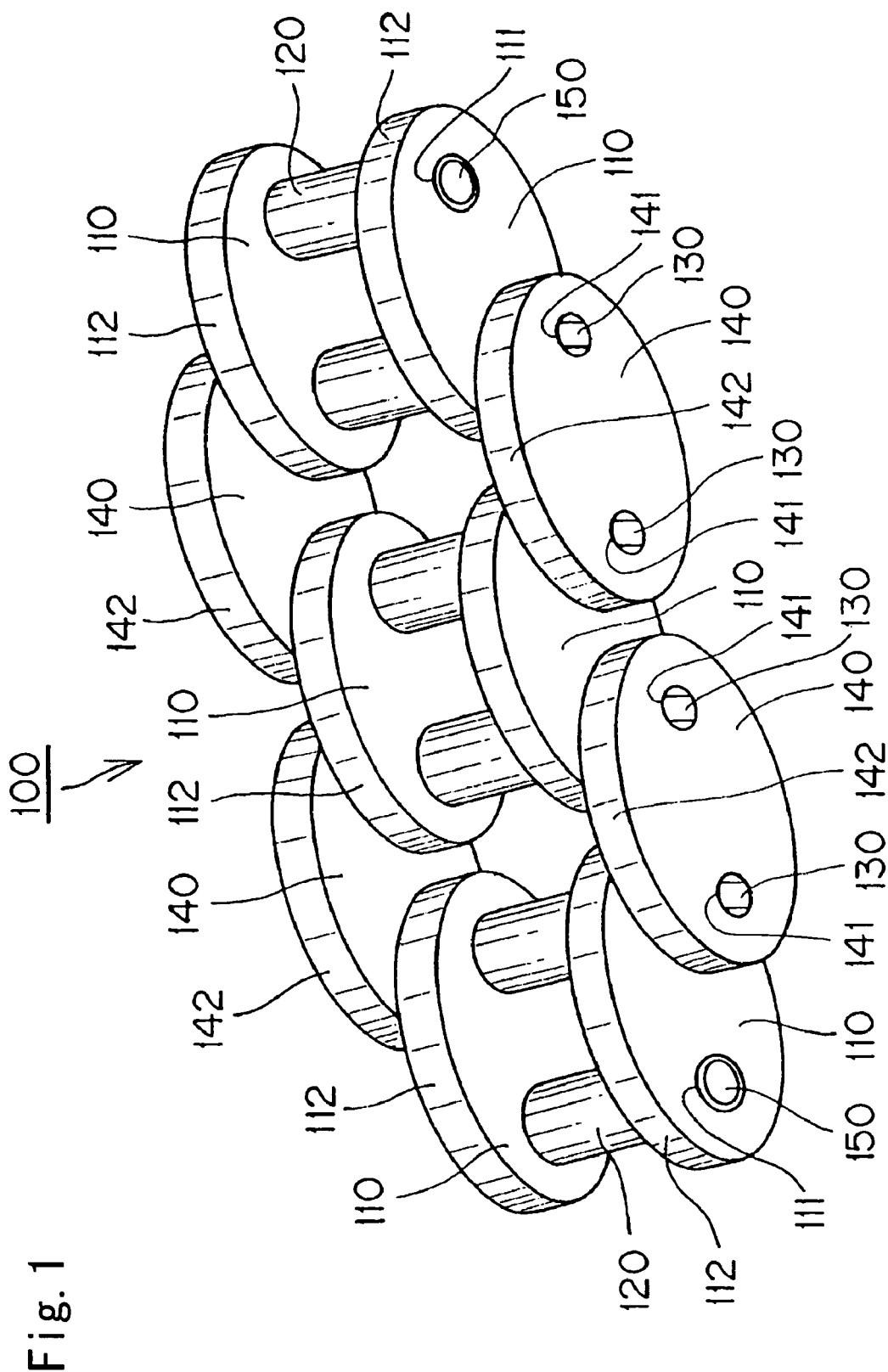
FIG. 1 is a perspective view showing a part of a low friction roller chain according to a first embodiment the invention.

The low friction chain 100, shown in FIG. 1, comprises pairs of spaced, opposed, right and left inner plates 110, bushings 150 press-fit into bushing holes 111 in plates 110, rollers 120 rotatable on the bushings 150, connecting pins 130 extending through the bushings 150 and rotatable therein, and pairs of spaced, opposed, right and left outer plates 140, having pin holes 141 into which the ends of pins 140 are press-fit. The pins 140 thus flexibly interconnect alternating links of a first set and second set, the first set being composed of links having inner link plates connected by bushings 150, and the second being composed of links having outer link plates connected by connecting pins 130.

In the embodiment shown in FIG. 1, both the inner plates 110 and the outer plates 140 are formed with upper and lower edges that are convex when viewed along a direction parallel to the direction of elongation of the connecting pins.

Figure 2:
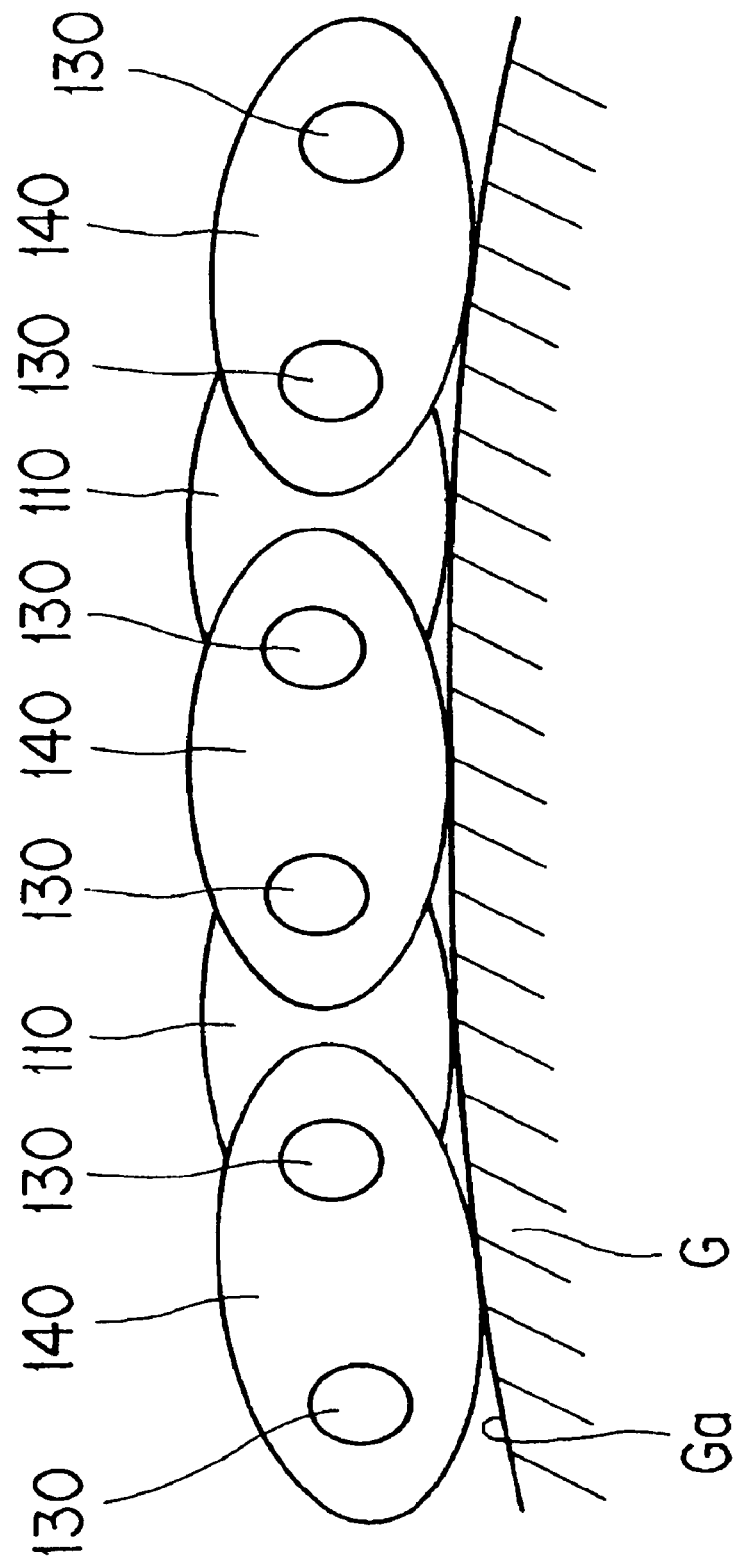
FIG. 2 is a schematic side elevational view showing the manner in which the link plates of the chain of FIG. 1 slide on a guide.

As shown in FIG. 2, the chain 100 travels in sliding contact with the shoe surface Ga of a guide G. Because the edge surfaces 112 and 142, which come into sliding contact with the guide G, are convex, the area over which the plates are in sliding contact with the shoe surface Ga of the guide G is smaller than the contact area in the case of a conventional roller chain having link plates with straight edges, and also smaller than the contact area in the case of a conventional roller chain having gourd-shaped link plates.

Figure 3:
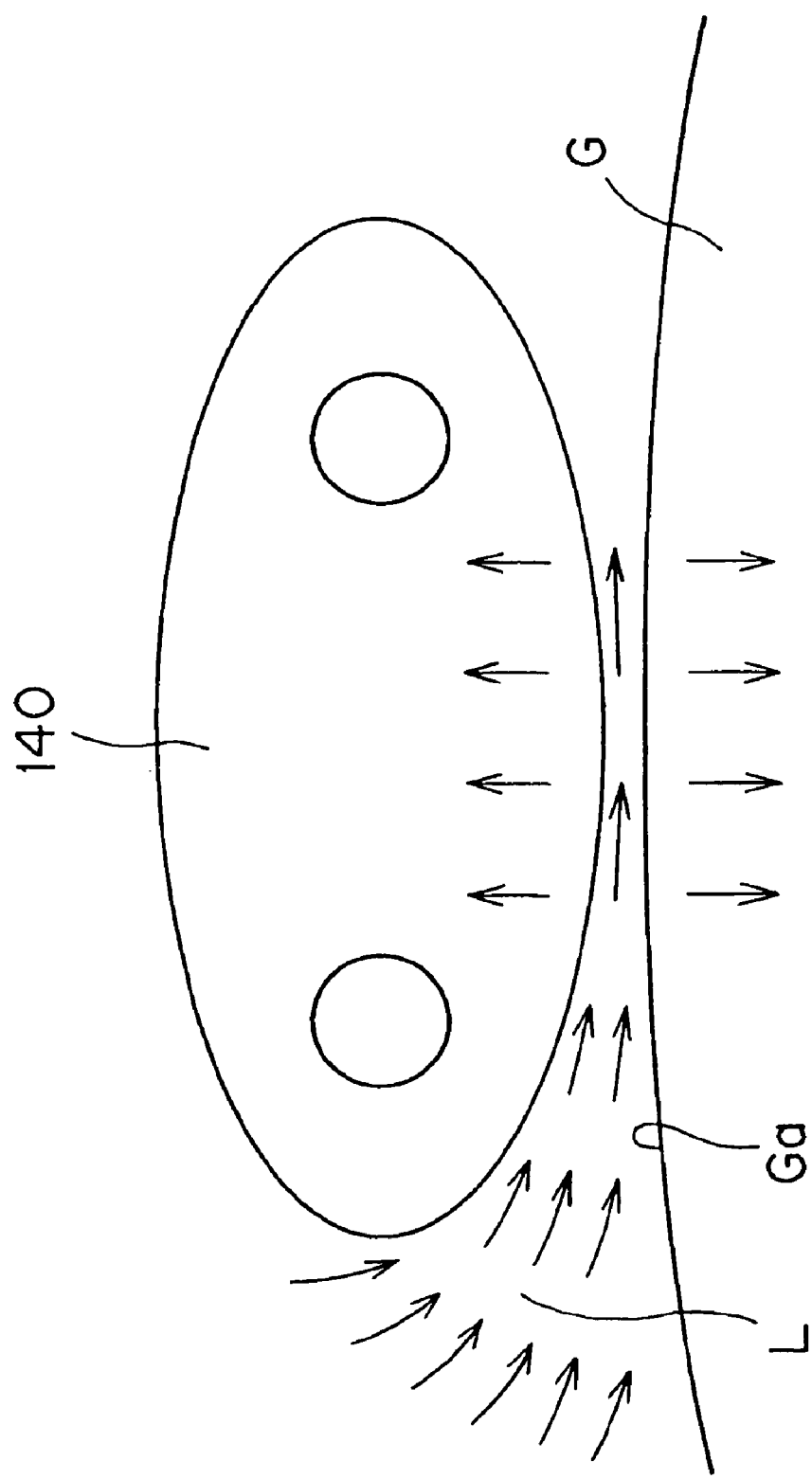
FIG. 3 is a schematic view showing the generation of Couette's flow and illustrating dynamic pressure due to the wedge film effect.

Since the inner and outer plates 110 and 140 have convex edge surfaces 112 and 142 which come into sliding contact with the guide G, when lubricating oil L is supplied to the chain, a wedge film effect is generated, as shown in FIG. 3. The lubricating oil L between the link plates and the guide enters a wide gap between a front portion of a link plate and the guide G, and proceeds to a narrow gap between the link plate edge, and the guide. Consequently, Couette's flow is produced, and dynamic pressure is generated, urging the link plates and the guide away from each other. As a result, improved wear resistance is realized, and combustion efficiency can be improved when the chain is used in an automobile engine.

Figure 4:
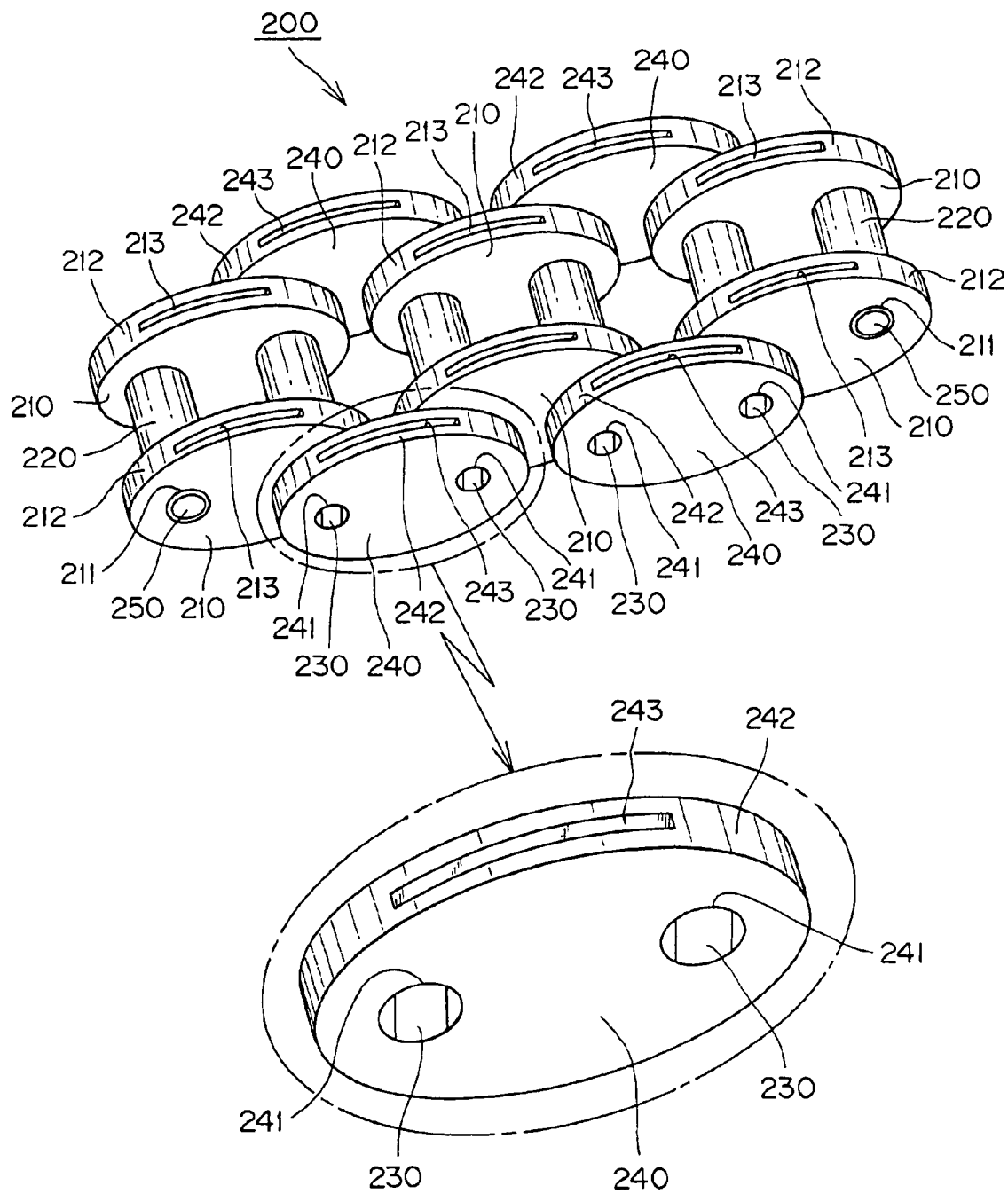
FIG. 4 is a perspective view showing a part of a low friction roller chain according to a second embodiment of the invention, including an enlargement of an outer link plate as an auxiliary view.

The low friction chain 200 shown in FIG. 4 is similar to the chain of FIG. 1 in that the guide-contacting surfaces of the link plates are convex. However, the guide-contacting surfaces are also provided with grooves.

More particularly, the roller chain 200 comprises pairs of spaced, opposed, right and left inner plates 210, bushings 250 press-fit into bush holes 211 in plates 210, rollers 220 rotatable on the bushings 250, connecting pins 230 extending through the bushings 250 and rotatable therein, and pairs of spaced, opposed, right and left outer plates 240, having pin holes 241 into which the ends of pins 240 are press-fit. The pins 240 thus flexibly interconnect alternating links of a first set and second set, the first set being composed of links having inner link plates connected by bushings 250, and the second being composed of links having outer link plates connected by connecting pins 230.

As in the embodiment of FIG. 1, both the inner plates 210 and the outer plates 240 are formed with upper and lower edges that are convex when viewed along a direction parallel to the direction of elongation of the connecting pins.

The surfaces 212 and 242, which come into sliding contact with the guide, are respectively provided with grooves 213 and 243. These grooves 213 and 243 are band-shaped grooves that extend longitudinally along the convex sliding contact surfaces past the location at which the height of the plate is maximum.

The chain of FIG. 4 has the same advantages as those of the chain of FIG. 1. In addition, because of the grooves, the sliding contact areas are still smaller than in the case of the chain of FIG. 1. Moreover, the concave grooves 213 and 243 hold lubricating oil and help maintain an oil film between the sliding contact surfaces of the link plates and the shoe of the guide. An additional advantage of the embodiment of FIG. 4 is that the band-shaped grooves suppress rocking of the chain with respect to the guide, so that more stable chain travel can be realized.

Figure 5:
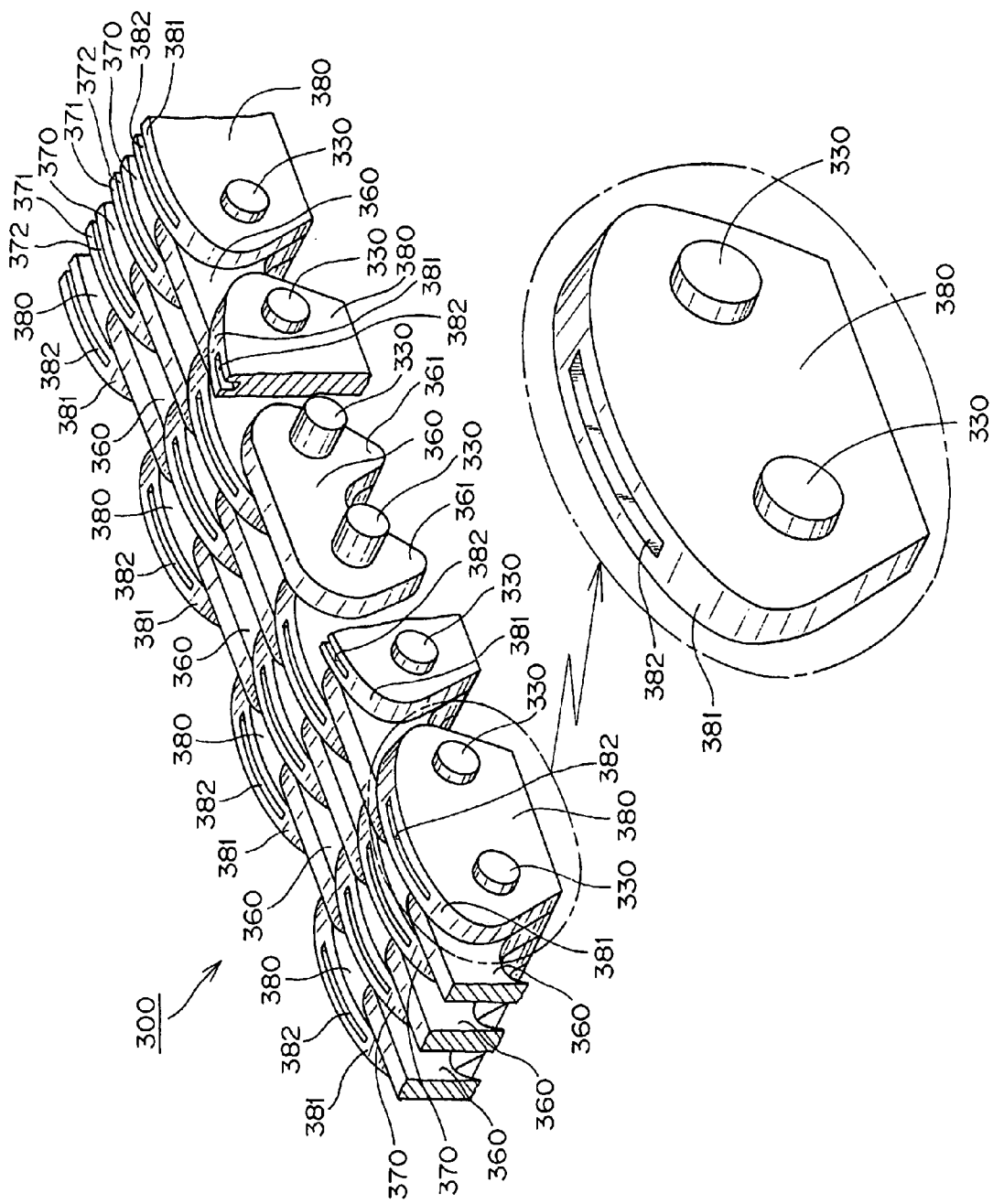
FIG. 5 is a perspective view showing a part of a low friction silent chain according to a third embodiment of the invention, including an enlargement of a guide plate of the chain as an auxiliary view.
Figure 6:
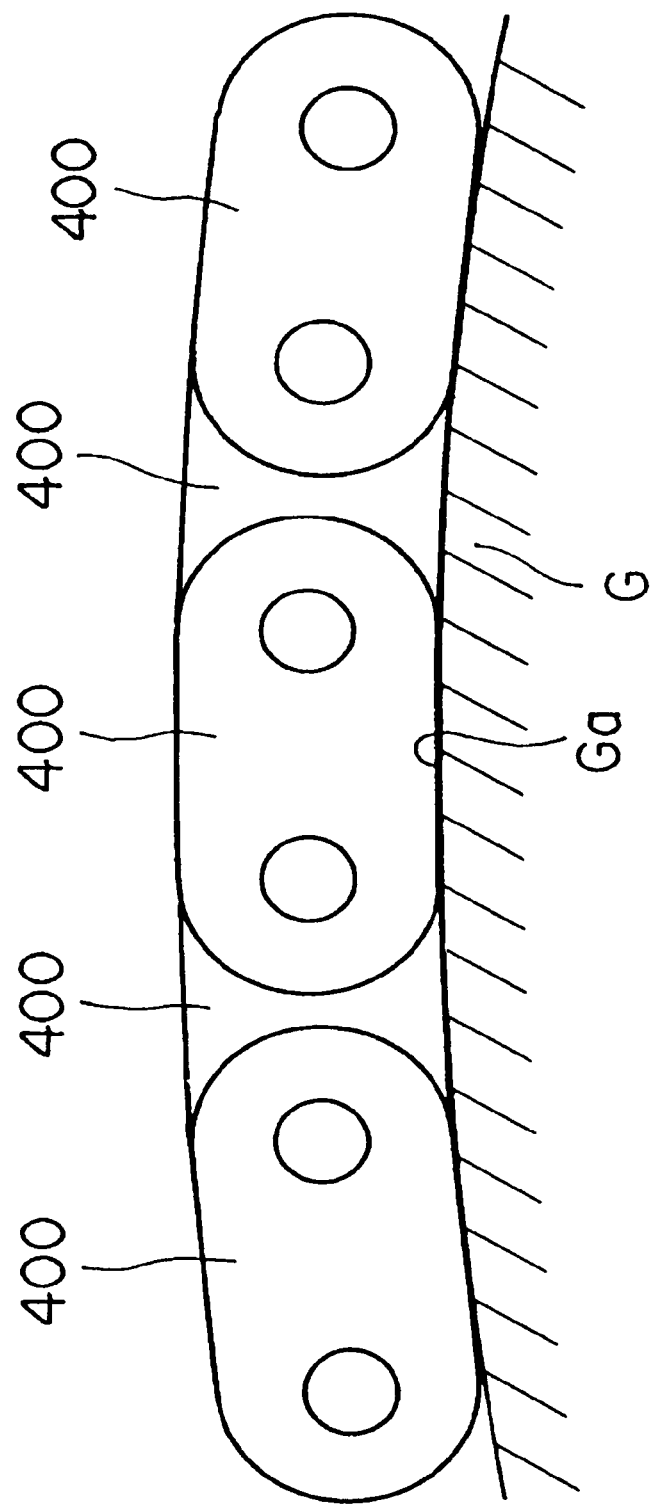
FIG. 6 is a schematic side elevational view showing the manner in which the link plates of a conventional roller chain slide on a guide.

In the embodiment shown in FIG. 5, the features of the invention are applied to a silent chain 300. The chain comprises joint row inner plates 360 each having teeth 361, which mesh with sprocket teeth (not shown) on an inner circumferential side of the chain. The chain also comprises guide row inner plates 370, and guide plates 380 at the ends of the guide rows. Inside surfaces of the guide plates abut side surfaces of the sprockets. The joint rows and the guide rows are arranged in alternating, interleaved, relationship and are connected by connecting pins 330.

As seen in FIG. 5, the backs of the inner plate 370 of the guide rows and the guide plate 380 are higher than the backs of the inner plates 360 of the joint row 360.

Thus, the inner plates 370 of the guide rows and the guide plates 380 are adapted to come into sliding contact with a guide. These back surfaces are convex in shape when viewed from the side, i.e., along the direction of elongation of the connecting pins. The back surfaces 371 and 381 are respectively provided with grooves 372 and 382. The grooves are band-shaped grooves that extend longitudinally along the convex back surface of each of plates 370 and 380 past the location at which the height of the back of the plate is maximum.

As in the embodiments of FIGS. 1 and 4, since the back surfaces 371 and 381 of the guide row inner plates 370 and the guide plates 380 are convex, the area of contact with a guide is smaller than in the case of a link plate having a straight back surface. Moreover, since the back surfaces 371 and 381 are provided with grooves 372 and 382, the contact areas are still further reduced.

The grooves 372 and 382 also hold lubricating oil and help to maintain an oil film between the back surfaces of the guide row plates the guide shoe.

As in the case of the embodiments of FIGS. 1 and 4, a wedge film effect is generated and Couette's flow is produced as the chain travels, and dynamic pressure urges the guide row plates away from the guide plate, so that good wear resistance is achieved and combustion efficiency can be improved when the chain is used in an automobile engine. Moreover, as in the case of the embodiment of FIG. 4, the band-shaped grooves help to maintain an improved contact balance in the chain width direction so that rocking can be suppressed and stable chain travel can be realized.

Finally, the contact area between the chain and the guide in the embodiment of FIG. 5, is also reduced because the backs of the guide row plates are higher than the backs of the joint row plates.

A significant reduction of wear is achieved by virtue of the convex backs of the plates, by the grooves, and by the fact that the backs of the guide row plates are higher than the backs of the joint row plates. As a result, combustion efficiency can be improved when the chain used in an automobile engine.

FIGS. 1, 4, and 5 illustrate preferred embodiments of the invention. In the case of a roller chain, all of the link plates preferably have convex surfaces for sliding contact with a guide, and where grooves are provided, they are provided in the edge surfaces of all of the guide-contacting plates. In the case of a silent chain, the grooves are preferably provided in the edges of all of the guide row plates.

However, various modifications can be made to the chains described. For example, the principles of the invention are applicable to rollerless bushing chains. Furthermore, the convex guide contacting surfaces can be provided on some or all of the plates of a chain, and the longitudinal grooves can be provided in some or all of the guide-contacting surfaces of the plates of a chain whether or not the guide contacting surfaces are convex. In the case of a roller chain, or a rollerless bushing chain, the guide-contacting surfaces of surfaces some or all of the plates can be convex, while the other edges of the same plates can be straight or made in any other desired shape.

In the case of a silent chain, any of the inner plates of the guide rows, the guide plates, and/or the joint row plates can be formed to come into sliding contact with a guide. Its back surface can have a convex shape corresponding to the shape of the back surface 381 of plates 380 in FIG. 5, and the back surface can be formed with or without a longitudinal groove.

We claim:

1. An elongated, low friction, chain from the group consisting of roller chains and bushing chains, comprising a plurality of links flexibly interconnected by connecting pins extending perpendicular to the direction of elongation of the chain, in which each link comprises a pair of link plates in parallel, spaced relationship, in which two of said connecting pins extend perpendicular to and intersect each link plate of the chain, in which each of the link plates has a first edge surface adapted to travel in sliding contact with a guide, and a second edge surface opposite from said first edge surface, the first and second edge surfaces of each link plate being symmetrical about a first imaginary line of symmetry extending from one to the other of the pins intersecting the last-mentioned link plate, in which the shape of each of said edge surfaces is convex when viewed in a direction parallel to the lengths of the connecting pins, and in which each said link plate is formed with ends spaced from each other along said direction of elongation of the chain, said ends being symmetrical about a second imaginary line of symmetry perpendicular to said first line of symmetry and located mid-way between the pins from which the first line of symmetry extends, in which at least some of said edge surfaces have a groove formed therein.

2. An elongated, low friction, chain from the group consisting of roller chains and bushing chains, comprising a plurality of links flexibility interconnected by connecting pins extending perpendicular to the direction of elongation of the chain, in which each link comprises a pair of link plates in parallel, spaced relationship, in which two of said connecting pins extend perpendicular to and intersect each link plate of the chain, in which each of the link plates has a first edge surface adapted to travel in sliding contact with a guide, and a second edge surface opposite from said first edge surface, the first and second edge surfaces of each link plate being symmetrical about a first imaginary line of symmetry extending from one to the other of the pins intersecting the last-mentioned link plate, and in which the shape of each of said edge surfaces is convex when viewed in a direction parallel to the lengths of the connecting pins, and in which each said link plate is formed with ends spaced from each other along said direction of elongation of the chain, said ends being symmetrical about a second imaginary line of symmetry perpendicular to said first line of symmetry and located mid-way between the pins from which the first line of symmetry extends, in which each of said link plates has opposite, substantially planar faces, said first edge surface of each of said link plates has an elongated groove formed therein, the groove extending along said first edge surface in a direction parallel to the faces of the plate.

* * * * *